(12) United States Patent
Gormley

(10) Patent No.: US 11,396,854 B2
(45) Date of Patent: Jul. 26, 2022

(54) HINGE MECHANISM FOR PIVOT DOOR THRUST REVERSERS

(71) Applicant: ROHR, INC., Chula Vista, CA (US)

(72) Inventor: Timothy Gormley, Bonita, CA (US)

(73) Assignee: Rohr, Inc., Chula Vista, CA (US)

(*) Notice: Subject to any disclaimer, the term of this patent is extended or adjusted under 35 U.S.C. 154(b) by 244 days.

(21) Appl. No.: 16/036,157

(22) Filed: Jul. 16, 2018

(65) Prior Publication Data

US 2019/0120171 A1 Apr. 25, 2019

Related U.S. Application Data

(60) Provisional application No. 62/577,079, filed on Oct. 25, 2017.

(51) Int. Cl.
*F02K 1/60* (2006.01)
*F02K 1/76* (2006.01)
*F02K 1/70* (2006.01)

(52) U.S. Cl.
CPC ............ *F02K 1/60* (2013.01); *F02K 1/70* (2013.01); *F02K 1/763* (2013.01); *F05D 2260/50* (2013.01)

(58) Field of Classification Search
CPC ... F02K 1/60; F02K 1/605; F02K 1/62; F02K 1/625; F02K 1/70; F02K 1/72; F02K 1/763; F02K 1/76
See application file for complete search history.

(56) References Cited

U.S. PATENT DOCUMENTS

| | | | |
|---|---|---|---|
| 3,002,342 A * | 10/1961 | Schatzki | F02K 1/60 239/127.3 |
| 3,266,734 A | 8/1966 | Gahagan et al. | |
| 3,483,702 A | 12/1969 | Ward | |
| 3,579,991 A * | 5/1971 | Nelson, Jr. | F02K 1/60 60/232 |
| 3,604,662 A * | 9/1971 | Nelson, Jr. | F02K 1/60 244/53 R |
| 3,764,096 A | 10/1973 | Wright | |
| 5,826,823 A | 10/1998 | Lymons et al. | |
| 6,009,702 A | 1/2000 | Gonidec et al. | |
| 6,256,979 B1 * | 7/2001 | Fournier | F02K 1/60 239/265.37 |
| 6,764,045 B2 | 7/2004 | Sternberger | |
| 8,172,175 B2 | 5/2012 | Lair | |
| 9,567,089 B2 | 2/2017 | Layland et al. | |
| 9,650,917 B2 | 5/2017 | Stewart et al. | |
| 9,695,778 B2 | 7/2017 | Suciu et al. | |
| 2003/0218094 A1 | 11/2003 | Lair | |
| 2009/0126340 A1 * | 5/2009 | Lair | F02K 1/60 60/226.2 |

OTHER PUBLICATIONS

European Patent Office, European Search Report dated Mar. 21, 2019 in Application No. 18202602.1.

* cited by examiner

Primary Examiner — Edwin Kang
(74) *Attorney, Agent, or Firm* — Snell & Wilmer L.L.P.

(57) ABSTRACT

A thrust reverser for a gas turbine engine includes a frame, a first reverser door pivotally mounted to the frame, and a second reverser door pivotally mounted to the first reverser door.

20 Claims, 5 Drawing Sheets

HINGE MECHANISM FOR PIVOT DOOR THRUST REVERSERS

CROSS-REFERENCE TO RELATED APPLICATIONS

This application claims priority to, and the benefit of, U.S. Prov. Pat. Appl., Ser. No. 62/577,079, entitled "Hinged On Opposite Door Thrust Reverser (HOOD-TR)," filed on Oct. 25, 2017, the entirety of which is incorporated herein for all purposes by this reference.

FIELD

The present disclosure relates generally to aircraft thrust reversers used with gas turbine engines and, more particularly, to hinge mechanisms for reverser doors used with pivot door thrust reversers.

BACKGROUND

Turbofan gas turbine engines are known to include a fan section that produces a bypass airflow for providing the majority of engine propulsion and a core engine section through which a core airflow is compressed, mixed with fuel, combusted and expanded through a turbine to drive the fan section. In a mixed flow turbofan engine, the cool bypass airflow is ducted between a surrounding nacelle and an outer casing of the core engine section and mixed with a hot exhaust stream from the core engine section prior to discharge from the engine nozzle in a combined or mixed exhaust stream. The surrounding nacelle may include thrust reversers capable of redirecting the bypass airflow from the rearward direction to, at least partially, a forward direction thus producing a rearward thrust that may serve to decelerate the forward motion of an aircraft and thereby assist braking the aircraft upon landing. Pivot door thrust reversers may be used with turbofan gas turbine engines for aircraft, including for corporate or business jets. A hinge mounting system for a pivot door thrust reverser is disclosed herein.

SUMMARY

A thrust reverser is disclosed. In various embodiments, the thrust reverser includes a frame, a first reverser door pivotally mounted to the frame, and a second reverser door pivotally mounted to the first reverser door. In various embodiments, the frame includes a longitudinal axis and a first end and a second end, with the second end spaced along the longitudinal axis from the first end, and the first reverser door is pivotally mounted to the frame proximate the second end. In various embodiments, the first reverser door includes an aft end and a first offset panel positioned proximate the aft end, and the first offset panel is pivotally mounted to the frame at a first pivot point. In various embodiments, the second reverser door includes an aft end and a first offset panel positioned proximate the aft end, and the first offset panel of the second reverser door is pivotally mounted to the first reverser door at a second pivot point. In various embodiments, the first pivot point is positioned on a first side of the longitudinal axis. In various embodiments, the second pivot point is positioned on a second side of the longitudinal axis opposite the first side.

In various embodiments, the frame includes a first side beam having a fore end and an aft end, the longitudinal axis extends longitudinally from the fore end of the first side beam to the aft end of the first side beam, and the first pivot point is spaced a first distance above the longitudinal axis and the second pivot point is spaced a second distance below the longitudinal axis. In various embodiments, the frame includes a second side beam having a fore end and an aft end, spaced a lateral distance from the first side beam, the second side beam has a second longitudinal axis extending longitudinally from the fore end of the second side beam to the aft end of the second side beam, and the first reverser door includes a second offset panel positioned proximate the aft end and pivotally mounted to the second side beam at a third pivot point. In various embodiments, the second reverser door includes a second offset panel positioned proximate the aft end and pivotally mounted to the first reverser door at a fourth pivot point.

In various embodiments, the third pivot point is laterally opposite the first pivot point, and the fourth pivot point is laterally opposite the second pivot point. In various embodiments, a first hinge-line extends through the first pivot point and the third pivot point, wherein a second hinge-line extends through the second pivot point and the fourth pivot point and wherein the first hinge-line is parallel to the second hinge-line.

In various embodiments, the thrust reverser further includes a first actuator having a first end connected to the frame and a second end connected to the first reverser door and a second actuator having a first end connected to the frame and a second end connected to the second reverser door. In various embodiments, the frame further includes a bulkhead, the first actuator is a linear actuator having the first end connected to the bulkhead and the second end connected to the first reverser door and the second actuator is a linear actuator having the first end connected to the bulkhead and the second end connected to the second reverser door.

A pivot door thrust reverser is disclosed according to various embodiments. The thrust reverser includes a frame having a central axis, a first side beam and a second side beam, the second side beam positioned on an opposite side of the central axis from the first side beam, a first reverser door pivotally mounted to the first side beam and to the second side beam, and a second reverser door pivotally mounted to the first reverser door.

In various embodiments, the first side beam includes an aft end, the second side beam includes an aft end, and the first reverser door is pivotally mounted to the frame proximate the aft end of the first side beam at a first pivot point and proximate the aft end of the second side beam at a third pivot point. In various embodiments, the first reverser door includes a first side and a second side, the second reverser door includes a first side and a second side, and the first side of the second reverser door is pivotally mounted to the first side of the first reverser door at a second pivot point and the second side of the second reverser door is pivotally mounted to the second side of the first reverser door at a fourth pivot point. In various embodiments, the third pivot point is laterally opposite the first pivot point and the fourth pivot point is laterally opposite the second pivot point and a first hinge-line extends through the first pivot point and the third pivot point, a second hinge-line extends through the second pivot point and the fourth pivot point and the first hinge-line is parallel to the second hinge-line.

In various embodiments, the thrust reverser further includes a first actuator having a first end connected to the frame and a second end connected to the first reverser door and a second actuator having a first end connected to the frame and a second end connected to the second reverser door. In various embodiments, the frame further includes a bulkhead, and the first actuator is a linear actuator having the first end connected to the bulkhead and the second end connected to the first reverser door and the second actuator is a linear actuator having the first end connected to the bulkhead and the second end connected to the second reverser door.

A pivot door thrust reverser is disclosed according to various embodiments, The thrust reverser includes a frame having a central axis, a forward bulkhead, a first side beam extending aft of the forward bulkhead and a second side beam extending aft of the forward bulkhead, the second side beam positioned on a laterally opposite side of the central axis from the first side beam, a lower reverser door pivotally mounted to the first side beam and to the second side beam, an upper reverser door pivotally mounted to the lower reverser door, and a first actuator having a first end connected to the frame and a second end connected to the lower reverser door and a second actuator having a first end connected to the frame and a second end connected to the upper reverser door.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

As used herein, a first component that is "radially outward" of a second component means that the first component is positioned at a greater distance away from a common axis than the second component. A first component that is "radially inward" of a second component means that the first component is positioned closer to the common axis than the second component. In the case of components that rotate circumferentially about a common axis, a first component that is radially inward of a second component rotates through a circumferentially shorter path than the second component. As used herein, "distal" refers to a direction outward or, generally, away from a reference component. As used herein, "proximal" or "proximate" refer to a direction inward or, generally, towards a reference component.

Figure 1:
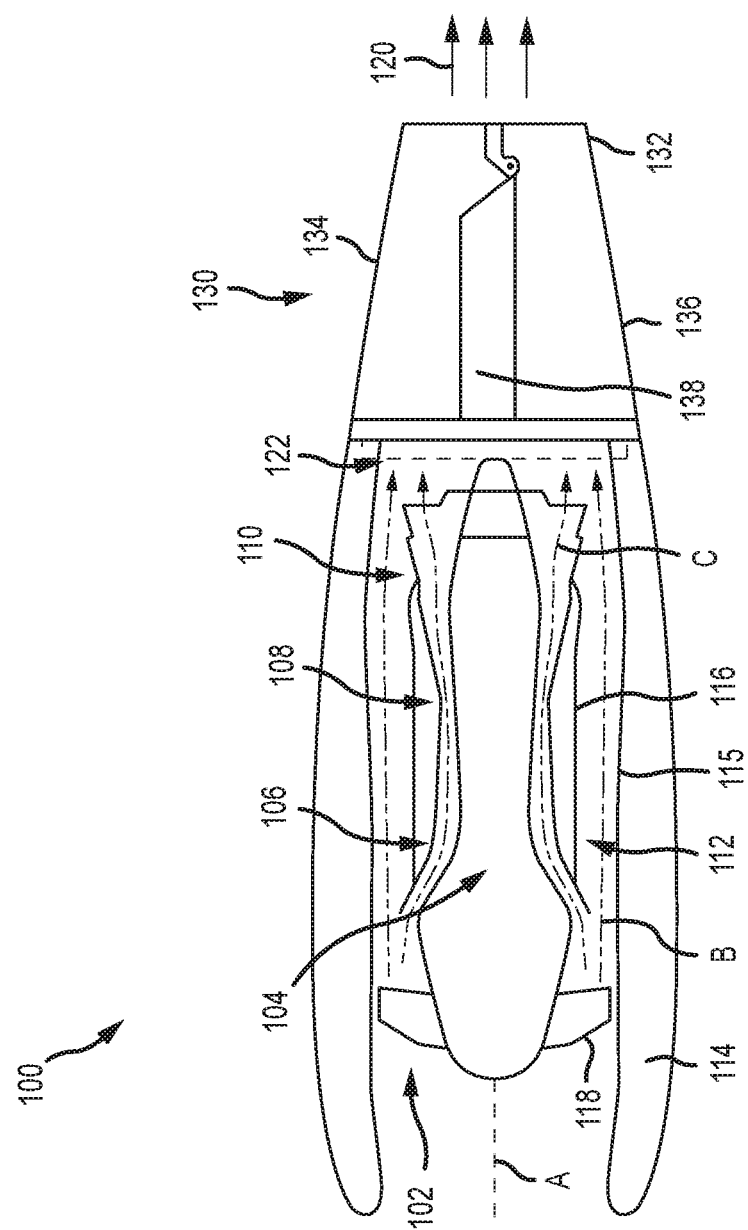
FIG. 1 is a schematic view of a gas turbine engine, in accordance with various embodiments.

Referring now to the drawings, FIG. 1 schematically illustrates a gas turbine engine 100 of the turbofan variety. The gas turbine engine 100 generally includes a fan section 102 and a core engine section 104, which includes a compressor section 106, a combustor section 108 and a turbine section 110. The fan section 102 drives air along a bypass flow path B in a bypass duct 112 defined within a radially inner surface 115 of a nacelle 114 and an outer casing 116 of the core engine section 104, while the compressor section 106 drives air along a core flow path C of the core engine section 104 for compression and communication into the combustor section 108 and then expansion through the turbine section 110.

The core engine section 104 may generally include a low speed spool and a high speed spool mounted for rotation about a central longitudinal axis A. The low speed spool generally includes an inner shaft that interconnects a fan 118 within the fan section 102, a low pressure compressor within the compressor section 106 and a low pressure turbine within the turbine section 110. The inner shaft may be connected to the fan 118 through a speed change mechanism or gear box to drive the fan 118 at a lower rotational speed than the rotational speed of the low speed spool. The high speed spool generally includes an outer shaft that interconnects a high pressure compressor within the compressor section 106 and a high pressure turbine within the turbine section 110. A combustor is arranged in the combustor section 108 between the high pressure compressor and the high pressure turbine. The air passing through the bypass flow path B mixes with the combustion gases exiting the core flow path C in a mixing section 122 positioned downstream of the core engine section 104 prior to discharge as a mixed exhaust stream 120, which provides the thrust achieved by the gas turbine engine 100.

A thrust reverser 130 is mounted to the aft end of the gas turbine engine 100. The thrust reverser 130 includes a generally annular exhaust duct 132, which defines an outer boundary for discharging the mixed exhaust stream 120 when the thrust reverser 130 assumes a closed, stowed or retracted position, as illustrated in FIG. 1. The thrust reverser 130 further includes an upper reverser door 134, a lower reverser door 136 and a pair of opposing side beams 138, which may house actuator componentry and connecting members used to open and close the upper reverser door 134 and lower reverser door 136. As discussed below, thrust reversal is affected by opening the upper reverser door 134 and the lower reverser door 136 to direct all or a portion of the mixed exhaust stream 120 in a direction having an upstream component relative to the central longitudinal axis A of the gas turbine engine 100. The momentum of the upstream component of the mixed exhaust stream 120 provides the reverse thrust used to decelerate an aircraft upon landing.

Figure 2:
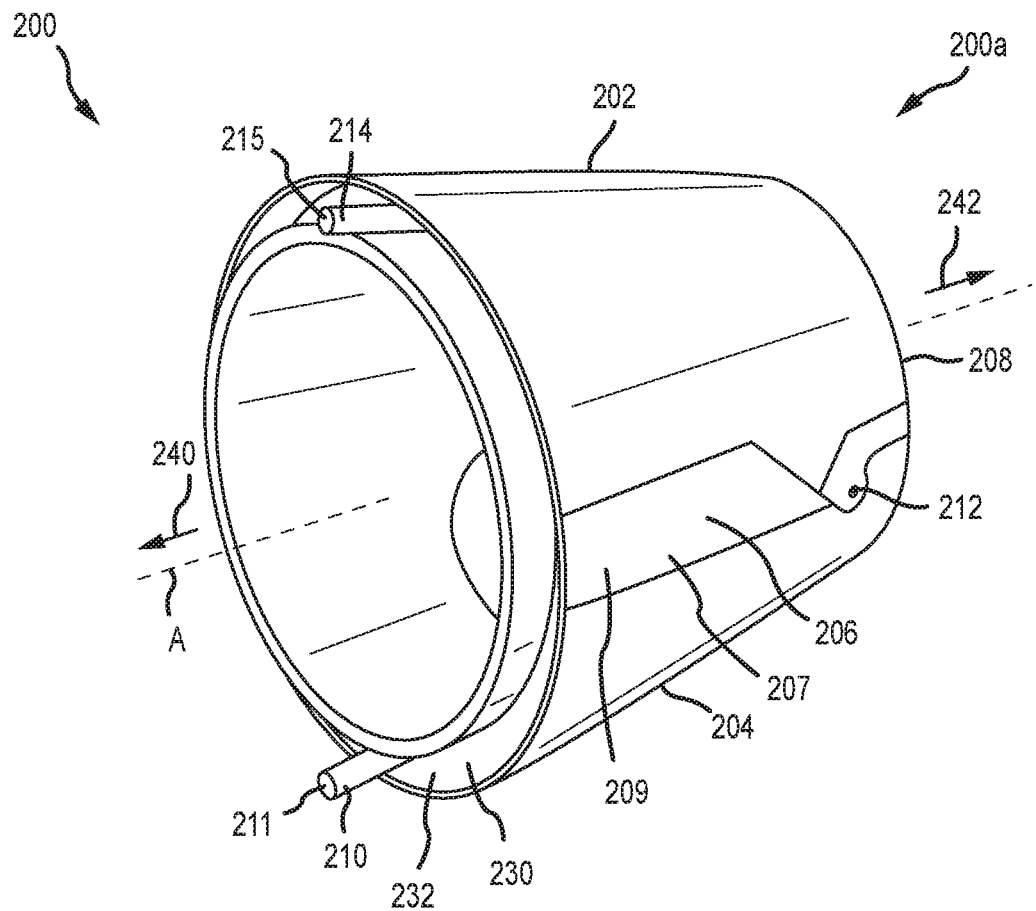
FIG. 2 is a schematic view of a stowed thrust reverser for a gas turbine engine, according to various embodiments.

Referring now to FIG. 2, a side view of a thrust reverser 200 according to various embodiments is illustrated in the closed, stowed or retracted position. The thrust reverser 200 includes an upper reverser door 202, a lower reverser door 204, a pair of opposing side beams 206 (only one is shown) and an exhaust duct 208. In various embodiments, a cover 207 may be incorporated into the opposing side beams 206 to affect an aerodynamic surface about an exterior of the thrust reverser 200. As described in more detail below, the pair of opposing side beams 206 provide, or are components of, a frame 230 that may also include a bulkhead 232. The frame 230 provides structural support for mounting components related to and operating the thrust reverser 200 between stowed and deployed states or positions. In various embodiments, for example, a first actuator 210 may have a first end 211 connected to the bulkhead 232 and a second end (hidden) connected to an inner surface of the lower reverser door 204. Similarly, a second actuator 214 may have a first end 215 connected to the bulkhead 232 and a second end (hidden) connected to an inner surface of the upper reverser door 202. As also described in further detail below, the thrust reverser includes a pivot 212 that connects the upper reverser door 202 to the lower reverser door 204.

Still referring to FIG. 2, a central axis A is illustrated extending through the thrust reverser 200. The central axis A may define a fore end or fore direction 240 of the thrust reverser 200 and an aft end or aft direction 242 of the thrust reverser 200. Various embodiments of the disclosure may be described in relation to the central axis A. For example, the upper reverser door 202 may be considered positioned above the central axis A while the lower reverser door 204 may be considered positioned below the central axis A. Similarly, a port side beam 209 may be considered positioned to the port or left side of the central axis A (looking in the fore direction 240) while a starboard side beam (hidden) may be considered positioned to the right or starboard side of the central axis A. More generally, however, reference to a first reverser door may generally refer to a reverser door positioned opposite a second reverser door with respect to the central axis A, there being no preferred up or down or side to side orientation, while reference to a first side beam may generally refer to a side beam positioned opposite a second side beam with respect to the central axis A. As used herein, a first object being positioned opposite a second does not imply one object is a mirror image of the other or is positioned symmetrically to the other, though such configurations or positioning are not excluded either.

Figure 3A:
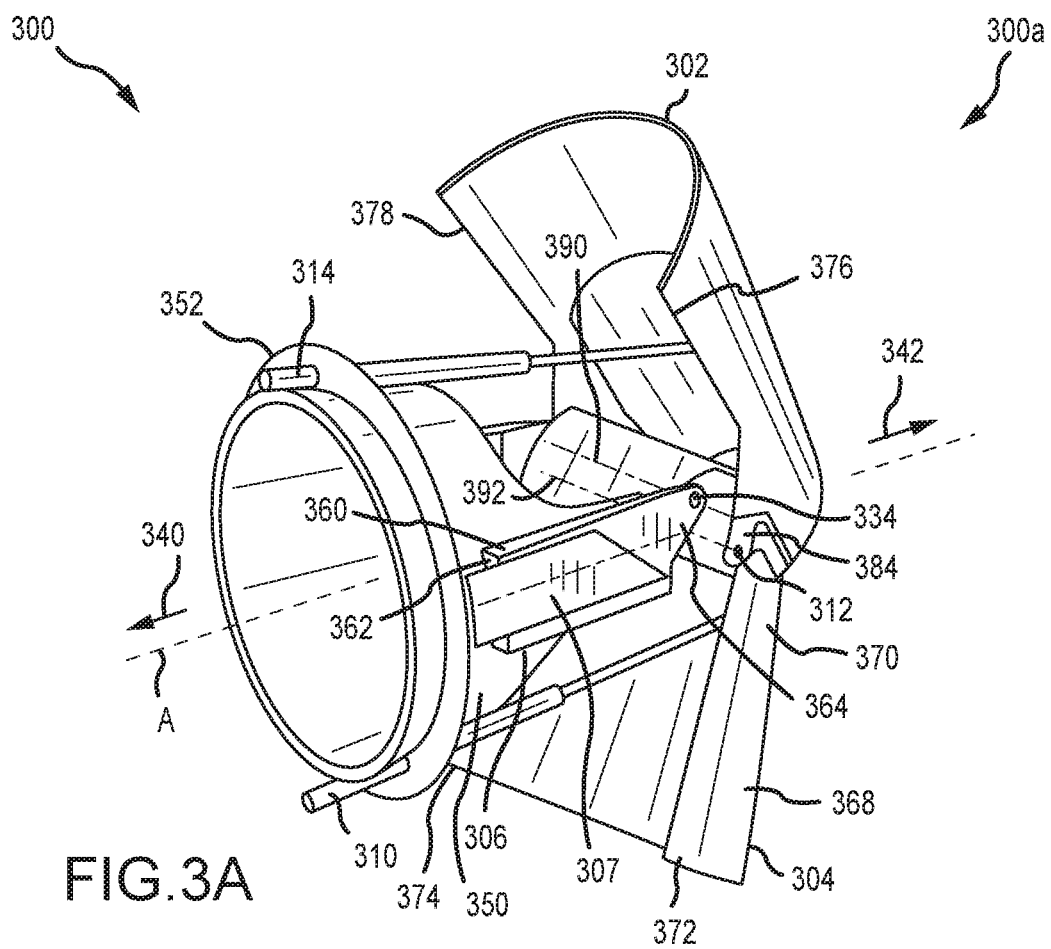
FIGS. 3A and 3B are a schematic views of a deployed thrust reverser for a gas turbine engine, according to various embodiments.
Figure 3B:
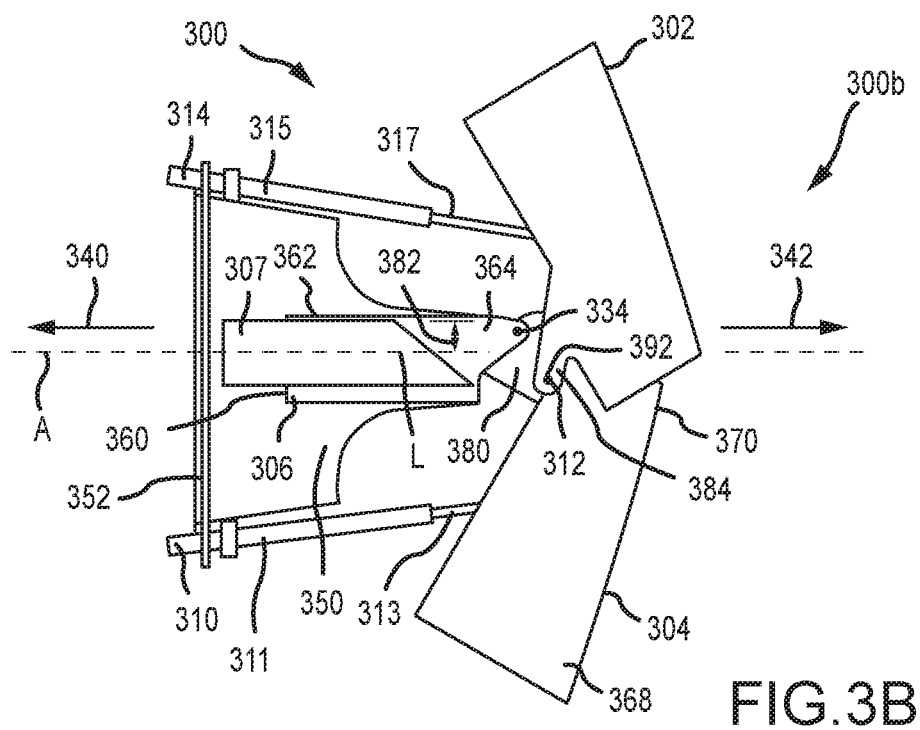

Referring now to FIGS. 3A and 3B, a schematic perspective view 300a of a thrust reverser 300 and a schematic side view 300b of a thrust reverser 300 are shown, according to various embodiments, in the open or deployed state or position. Similar to the foregoing description with reference to FIG. 2, the thrust reverser 300 includes a second or upper reverser door 302, a first or lower reverser door 304 and a pair of opposing side beams 306 (only one is shown). The thrust reverser 300 includes a frame 350 which, without loss of generality, may itself comprise, singularly or together, one or both of the pair of opposing side beams 306 and a bulkhead 352. A central axis A may extend through the thrust reverser 300 while, in various embodiments, a longitudinal axis L may extend through one of the pair of opposing side beams 306. Both the central axis A and the longitudinal axis L may be considered to run fore and aft with respect to a fore direction 340 and an aft direction 342. In various embodiments, a cover 307 may be incorporated into the opposing side beams 306 to affect an aerodynamic surface about an exterior of the thrust reverser 300.

Still referring to FIGS. 3A and 3B, the thrust reverser 300 includes a first side beam 360. The first side beam 360 includes a longitudinal axis L extending generally in fore and aft directions and has a first or fore end 362 and a second or aft end 364. The first or lower reverser door 304 includes a fore end 368 and an aft end 370. The first or lower reverser door 304 is generally arcuate in cross section and includes a first side 372 and a second side 374 that generally run fore and aft along the length of the reverser door. The second or upper reverser door 302 has similar characteristics, including fore and aft ends and a first side 376 and a second side 378. The first or lower reverser door 304 is pivotally mounted to the first side beam 360 at a first pivot point 334. In various embodiments, the first pivot point 334 may comprise a pin or a spherical bearing. The first or lower reverser door 304 includes an offset panel 380 that extends from the first side 372 of the first or lower reverser door 304 a distance sufficient to pivotally connect with the first side beam 360 at the first pivot point 334. Referring briefly to FIG. 3B, the first pivot point 334 is spaced a first offset distance 382 from the longitudinal axis L. In various embodiments, the first offset distance 382 can be positive (e.g., above the longitudinal axis L) or negative (e.g., below the longitudinal axis L). The first or lower reverser door 304 may further include an offset panel on the second side 374 of the first or lower reverser door 304 that is pivotally connected to a second side beam (hidden) in a manner similar to that just described. In various embodiments, a first hinge-line 390 extends through the first pivot point 334 on the first side 372 of the first or lower reverser door 304 and the pivotal connection on the second side 374 of the first or lower reverser door 304. In various embodiments, the first hinge-line 390 will extend in a direction perpendicular to the central axis A. In various embodiments, the pivotal connection on the second side 374 of the first or lower reverser door 304 is laterally opposite the first pivot point 334.

While the first or lower reverser door 304, as above described, is pivotally mounted to the first and second side beams, the second or upper reverser door 302, as described below, is pivotally mounted to the first or lower reverser door 304. The second or upper reverser door 302 includes an offset panel 384 that extends from the first side 376 of the second or upper reverser door 302 a distance sufficient to pivotally connect with the first or lower reverser door 304 at a second pivot point 312. In various embodiments, the second pivot point 312 may comprise a pin or a spherical bearing. The second pivot point 312 extends through both the offset panel 384 of the second or upper reverser door 302 and the offset panel 380 of the first or lower reverser door 304. The second or upper reverser door 302 may further include an offset panel on the second side 378 of the second or upper reverser door 302 that is pivotally connected to an offset panel on the second side 374 of the first or lower reverser door 304 in a manner similar to that just described. In various embodiments, a second hinge-line 392 extends through the second pivot point 312 on the first side 376 of the second or upper reverser door 302 and the pivotal connection on the second side 378 of the second or upper reverser door 302. In various embodiments, the second hinge-line 392 will extend in a direction perpendicular to the central axis A. In various embodiments, the pivotal connection on the second side 378 of the second or upper reverser door 302 is laterally opposite the second pivot point 312. In various embodiments, the second hinge-line 392 may be fore or aft of the first hinge-line 390. In various embodiments, the first hinge line 390 may be parallel to the second hinge line 392. In various embodiments, the first hinge-line 390 may be non-parallel to the second hinge-line 392. In various embodiments, the first hinge line 390 may be above the second hinge line 392 (e.g., with respect to a vertical plane) and in various embodiments the first hinge-line 390 may be below the second hinge line 392 (e.g., with respect to a vertical plane).

The above disclosure describes a thrust reverser 300 having a first or lower reverser door 304 that is pivotally mounted to first and second side beams and a second or upper reverser door 302 that is pivotally mounted to the first or lower reverser door 304. In various embodiments, the structure of the various components of the pivot mechanisms described above with respect to the first side 372 of the first or lower reverser door 304 and the first side 376 of the second or upper reverser door 302 is symmetrically identical to the structure of the various components of the pivot mechanisms described with respect to the second side 374 of the first or lower reverser door 304 and the second side 378 of the second or upper reverser door 302.

Referring still to FIGS. 3A and 3B, the thrust reverser 300 may further include a first actuator configured to open and close the first or lower reverser door 304. In various embodiments, a linear actuator 310 is employed to open and close the first or lower reverser door 304. The linear actuator 310 may include a first end 311 pivotally connected to the bulkhead 352 and a second end 313 pivotally connected to the first or lower reverser door 304. In various embodiments, the linear actuator 310 is centrally positioned between the first side beam 360 and the second side beam and the second end 313 of the linear actuator 310 is connected to a center portion of the inner surface of the first or lower reverser door 304. The thrust reverser 300 may further include a second actuator configured to open and close the second or upper reverser door 302. In various embodiments, a linear actuator 314 is employed to open and close the second or upper reverser door 302. The linear actuator 314 may include a first end 315 pivotally connected to the bulkhead 352 and a second end 317 pivotally connected to the second or upper reverser door 302. In various embodiments, the linear actuator 314 is centrally positioned between the first side beam 360 and the second side beam and the second end 317 of the linear actuator 314 is connected to a center portion of the inner surface of the second or upper reverser door 302. In various embodiments, the actuator, e.g., the linear actuator 310, is positioned off-center, such as adjacent the first side beam 360 or the second side beam. In various embodiments, multiple actuators may be used to affect opening and closing of the first and second reverser doors.

Figure 4A:
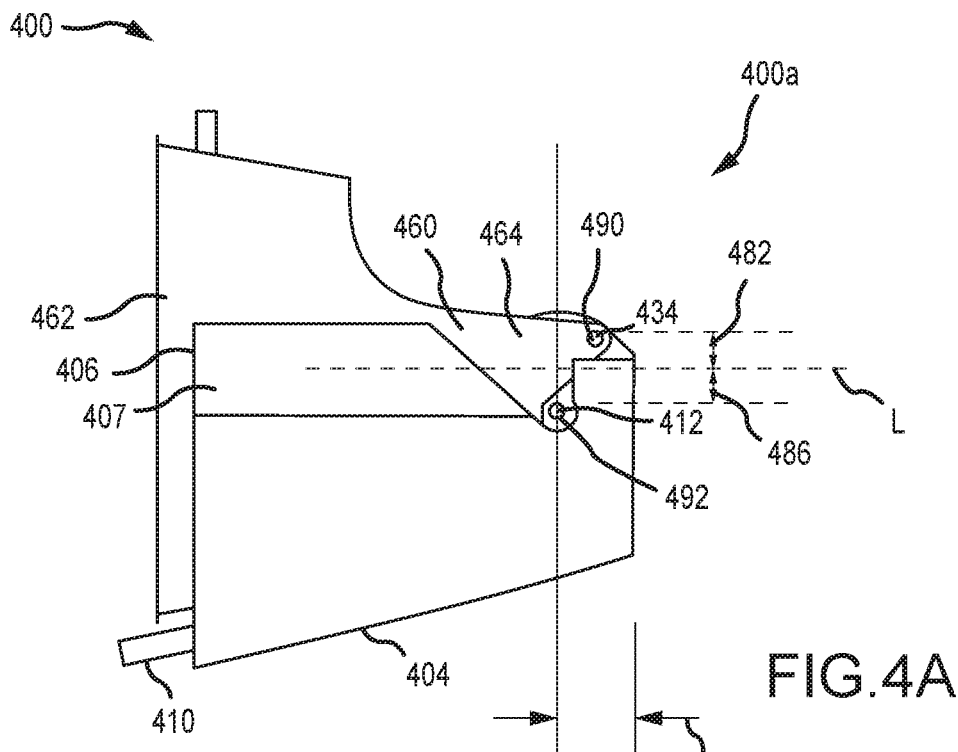
FIGS. 4A and 4B are schematic side views of a thrust reverser according to various embodiments.
Figure 4B:
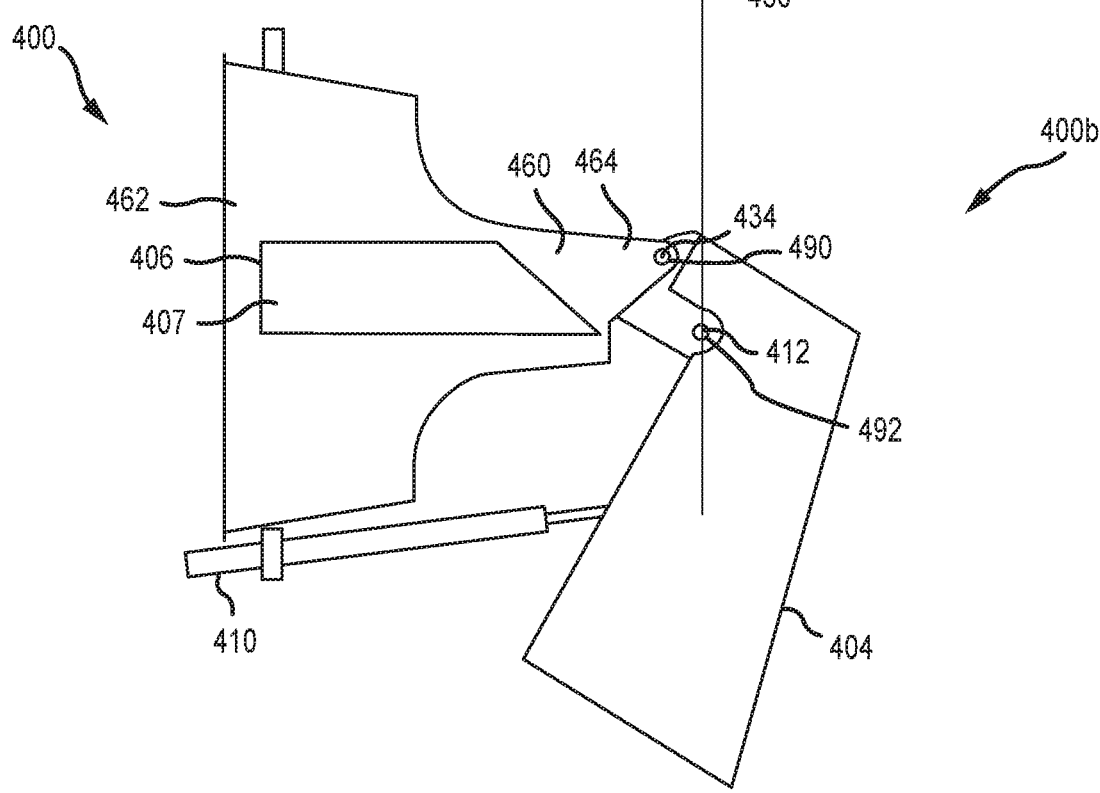
Figure 5A:
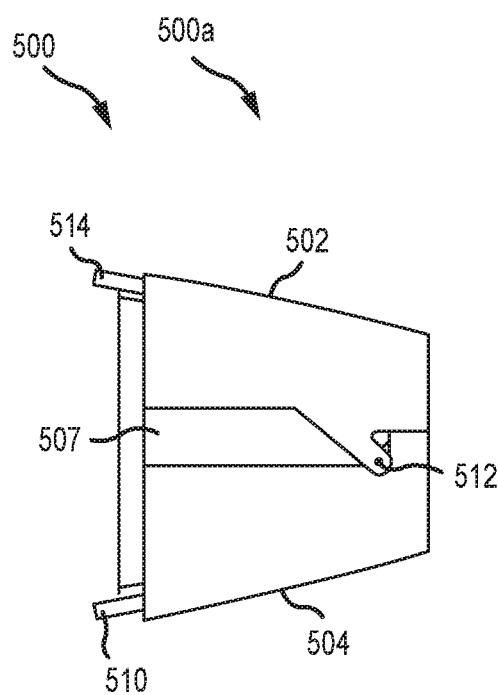
FIGS. 5A, 5B, 5C and 5D are schematic side views of a thrust reverser according to various embodiments, illustrating a progression of steps between stowed and deployed states.
Figure 5B:
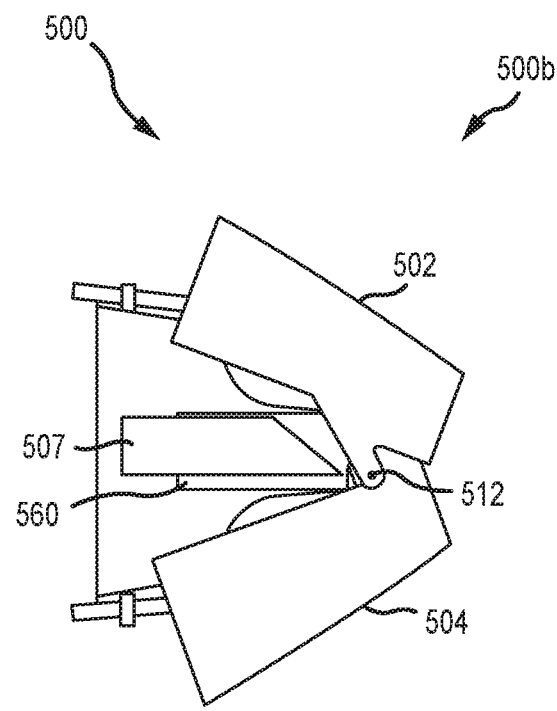
Figure 5C:
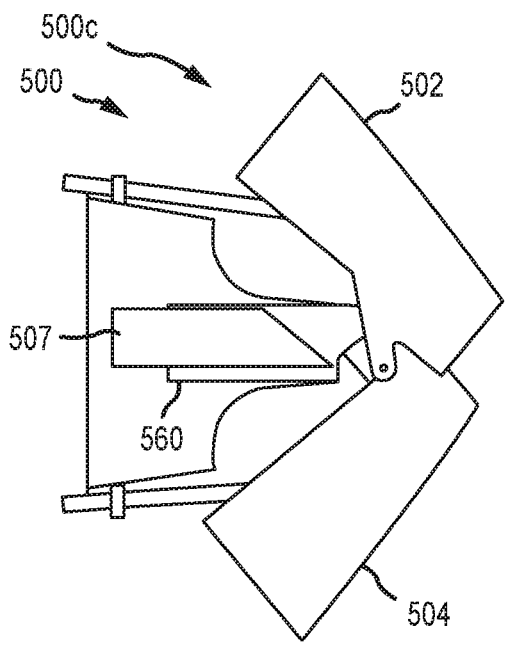
Figure 5D:
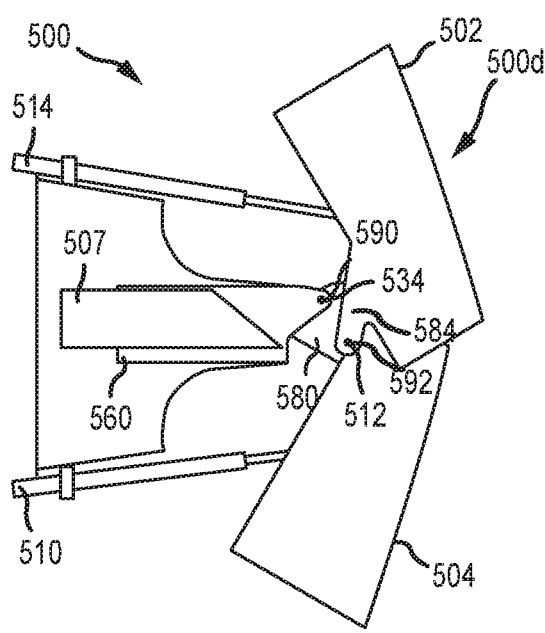

Referring now to FIGS. 4A and 4B, a schematic side view of a thrust reverser 400 in a stowed position 400a and a schematic side view of a thrust reverser 400 in a deployed position 400b are shown, according to various embodiments. The thrust reverser 400, shown with only a first reverser door 404, includes many of the components above described, including a first side beam 460, having a cover 407 and a longitudinal axis L, a fore end 462 and an aft end 464, a first actuator 410, a first pivot point 434 and a second pivot point 412. Also similar to the above description, a first hinge-line 490 and a second hinge-line 492 extend laterally through the first pivot point 434 and the second pivot point 412, respectively, and through symmetrical pivot points (e.g., third and fourth pivot points) on the opposite side of the thrust reverser 400. As seen in the illustrations, as the first reverser door 404 opens from a stowed position 400a to a deployed position 400b, the second hinge-line 492 translates aft a distance 450. The arrangement of the first hinge-line 490 and the second hinge-line 492 results in both the first reverser door 404 and a second reverser door (not illustrated for clarity) pivotally attached to the first reverser door 404 to translate aft when opened to a deployed position.

In various embodiments, while in the stowed position 400a, the first hinge-line 490 and the second hinge-line 492 may be oriented parallel to one another (e.g., directly above and below one another) or not parallel, such that the first hinge-line 490 is aft of the second hinge-line 492, or vice versa. In various embodiments, the first hinge-line 490, where the first reverser door 404 is pivotally connected to the first side beam 460, is positioned on an upper or first side of a longitudinal axis L and spaced a first distance 482 from the longitudinal axis. In various embodiments, the second hinge-line 492, where the second reverser door is pivotally connected to the first reverser door 404, is positioned on a lower or second side of the longitudinal axis L and spaced a second distance 486 from the longitudinal axis. In various embodiments, one or both of the first distance 482 and the second distance 486 are greater than zero. In various embodiments, one or both of the first distance 482 and the second distance 486 may be greater than or less than zero, meaning the corresponding hinge-lines may be on the same side of the longitudinal axis L or on opposite sides of the longitudinal axis L.

In various embodiments, the first hinge-line and the second hinge-line 492 assume one or more of the relative positions and orientations described above with reference to FIGS. 3A and 3B. In various embodiments, the first hinge-line 490 and the second hinge-line 492 may be positioned such that the reverser doors may nest within one another in a deployed state, to enable full line-of-sight blockage of the engine. Generally, pivot door thrust reversers have difficulty achieving an absolute seal between the aft ends of the doors when deployed, resulting in potentially undesired thrust vectoring. The herein disclosure facilitates one or the other door to pivot farther than the other, thereby offsetting any undesired thrust vectoring that may otherwise result.

Referring to FIGS. 5A, 5B, 5C and 5D, various kinematic positions of a thrust reverser 500 are illustrated during operation as the thrust reverser opens from a closed or stowed state 500a, to a first partially deployed state 500b, to a second partially deployed state 500c and, finally, to a fully deployed state 500d. Similar to the above description, the thrust reverser 500 includes a first or lower reverser door 504, a second or upper reverser door 502, a frame, including a first side beam 560, and a cover 507. The first or lower reverser door 504 includes an offset panel 580 that is pivotally mounted to the first side beam 560 at a first pivot point 534 and the second or upper reverser door 502 includes an offset panel 584 that is pivotally mounted to the first or lower reverser door 504 at a second pivot point 512. Starting from the stowed state 500a, a first actuator 510 urges the first or lower reverser door 504 to pivot in an anti-clockwise manner about the first pivot point 534 or first hinge-line 590, which extends through the first side beam 560. A second actuator 514 urges the second or upper reverser door 502 to pivot in a clockwise manner about the second pivot point 512 or second hinge-line 592, which extends through the first or lower reverser door 504. The process continues through each of the stages illustrated in FIGS. 5A-D until a fully deployed state 500d is reached. To stow the reverser doors from a deployed state or position, the process is reversed.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed:

1. A thrust reverser, comprising:
a frame;
a first reverser door pivotally mounted to the frame at a first hinge line and
a second reverser door pivotally mounted directly to the first reverser door at a second hinge line, the second hinge line extending through both the first reverser door and the second reverser door,
wherein upon deployment of the thrust reverser, the first hinge line is configured to remain stationary with respect to the frame and the second hinge line is configured to rotate about the first hinge line, from a first position forward of the first hinge line to a second position aft of the first hinge line.

2. The thrust reverser of claim 1, wherein the frame includes a longitudinal axis and a first end and a second end, the second end spaced along the longitudinal axis from the first end, and wherein the first reverser door is pivotally mounted to the frame proximate the second end.

3. The thrust reverser of claim 2, wherein the first reverser door includes an aft end and a first offset panel positioned proximate the aft end of the first reverser door and wherein the first offset panel is pivotally mounted to the frame at a first pivot point.

4. The thrust reverser of claim 3, wherein the second reverser door includes an aft end and a first offset panel positioned proximate the aft end of the second reverser door and wherein the first offset panel of the second reverser door is pivotally mounted to the first reverser door at a second pivot point.

5. The thrust reverser of claim 4, wherein the first pivot point is positioned on a first side of the longitudinal axis.

6. The thrust reverser of claim 5, wherein the second pivot point is positioned on a second side of the longitudinal axis opposite the first side.

7. The thrust reverser of claim 6, wherein the frame comprises a first side beam having a fore end and an aft end, wherein the longitudinal axis extends longitudinally from the fore end of the first side beam to the aft end of the first side beam, and wherein the first pivot point is spaced a first distance above the longitudinal axis and the second pivot point is spaced a second distance below the longitudinal axis.

8. The thrust reverser of claim 7, wherein the frame includes a second side beam having a fore end and an aft end, spaced a lateral distance from the first side beam, wherein the second side beam has a second longitudinal axis extending longitudinally from the fore end of the second side beam to the aft end of the second side beam, and wherein the first reverser door includes a second offset panel positioned proximate the aft end of the first reverser door and pivotally mounted to the second side beam at a third pivot point.

9. The thrust reverser of claim 8, wherein the second reverser door includes a second offset panel positioned proximate the aft end of the second reverser door and pivotally mounted to the first reverser door at a fourth pivot point.

10. The thrust reverser of claim 9, wherein the third pivot point is laterally opposite the first pivot point and wherein the fourth pivot point is laterally opposite the second pivot point.

11. The thrust reverser of claim 10, wherein the first hinge line extends through the first pivot point and the third pivot point, wherein the second hinge line extends through the second pivot point and the fourth pivot point and wherein the first hinge line is parallel to the second hinge line.

12. The thrust reverser of claim 11, further comprising a first actuator having a first end connected to the frame and a second end connected to the first reverser door and a second actuator having a first end connected to the frame and a second end connected to the second reverser door.

13. The thrust reverser of claim 12, wherein the frame further comprises a bulkhead and wherein the first actuator is a linear actuator having the first end connected to the bulkhead and the second end connected to the first reverser door and wherein the second actuator is a linear actuator having the first end connected to the bulkhead and the second end connected to the second reverser door.

14. A pivot door thrust reverser, comprising:
a frame having a central axis, a first side beam and a second side beam, the second side beam positioned on an opposite side of the central axis from the first side beam;
a first reverser door pivotally mounted to the first side beam and to the second side beam at a first hinge line; and
a second reverser door pivotally mounted directly to the first reverser door at a second hinge line, the second hinge line extending through both the first reverser door and the second reverser door,
wherein upon deployment of the thrust reverser, the first hinge line is configured to remain stationary with respect to the frame and the second hinge line is configured to rotate about the first hinge line, from a first position forward of the first hinge line to a second position aft of the first hinge line.

15. The thrust reverser of claim 14, wherein the first side beam includes an aft end, wherein the second side beam includes an aft end and wherein the first reverser door is pivotally mounted to the frame proximate the aft end of the first side beam at a first pivot point and proximate the aft end of the second side beam at a third pivot point.

16. The thrust reverser of claim 15, wherein the first reverser door includes a first side and a second side, wherein the second reverser door includes a first side and a second side and wherein the first side of the second reverser door is pivotally mounted to the first side of the first reverser door at a second pivot point and wherein the second side of the second reverser door is pivotally mounted to the second side of the first reverser door at a fourth pivot point.

17. The thrust reverser of claim 16, wherein the third pivot point is laterally opposite the first pivot point, wherein the fourth pivot point is laterally opposite the second pivot point, wherein the first hinge line extends through the first pivot point and the third pivot point, wherein the second hinge line extends through the second pivot point and the fourth pivot point and wherein the first hinge line is parallel to the second hinge line.

18. The thrust reverser of claim 17, further comprising a first actuator having a first end connected to the frame and a second end connected to the first reverser door and a second actuator having a first end connected to the frame and a second end connected to the second reverser door.

19. The thrust reverser of claim 18, wherein the frame further comprises a bulkhead and wherein the first actuator is a linear actuator having the first end connected to the bulkhead and the second end connected to the first reverser door and wherein the second actuator is a linear actuator having the first end connected to the bulkhead and the second end connected to the second reverser door.

20. A pivot door thrust reverser, comprising:
a frame having a central axis, a forward bulkhead, a first side beam extending aft of the forward bulkhead and a second side beam extending aft of the forward bulkhead, the second side beam positioned on a laterally opposite side of the central axis from the first side beam;
a lower reverser door pivotally mounted to the first side beam and to the second side beam at a first hinge line;
an upper reverser door pivotally mounted directly to the lower reverser door at a second hinge line, the second hinge line extending through both the lower reverser door and the upper reverser door; and
a first actuator having a first end connected to the frame and a second end connected to the lower reverser door and a second actuator having a first end connected to the frame and a second end connected to the upper reverser door,
wherein upon deployment of the thrust reverser, the first hinge line is configured to remain stationary with respect to the frame and the second hinge line is configured to rotate about the first hinge line, from a first position forward of the first hinge line to a second position aft of the first hinge line.

* * * * *